(12) United States Patent
Lee (10) Patent No.: US 7,665,752 B2
(45) Date of Patent: Feb. 23, 2010

(54) TORSION BEAM OF SUSPENSION

(75) Inventor: Jae Youn Lee, Seoul (KR)

(73) Assignees: Hyundai Motor Company, Seoul (KR); Kia Motor Company, Seoul (KR)

( * ) Notice: Subject to any disclaimer, the term of this patent is extended or adjusted under 35 U.S.C. 154(b) by 0 days.

(21) Appl. No.: 11/971,655

(22) Filed: Jan. 9, 2008

(65) Prior Publication Data
US 2009/0020974 A1   Jan. 22, 2009

(30) Foreign Application Priority Data
Jul. 20, 2007   (KR) .................. 10-2007-0072932

(51) Int. Cl.
*B60G 11/18*   (2006.01)
(52) U.S. Cl. .................. 280/124.137; 280/124.149; 280/124.152
(58) Field of Classification Search .......... 280/124.137, 280/124.138, 124.139, 124.149, 124.152
See application file for complete search history.

(56) References Cited

U.S. PATENT DOCUMENTS 3,733,087 A * 5/1973 Allison ................. 280/124.146
5,662,348 A * 9/1997 Kusama et al. ........ 280/124.134
6,648,350 B1 * 11/2003 Clements et al. ...... 280/124.106

* cited by examiner

*Primary Examiner*—Toan C To
(74) *Attorney, Agent, or Firm*—Morgan, Lewis & Bockius LLP

(57) ABSTRACT

There is provided a torsion beam of a vehicle suspension in which a upper portion and the lower portion of the torsion beam are bent in the front-to-rear direction alone of the vehicle along the longitudinal axis of the torsion beam, and a pair of tails is rounded at both front and rear ends of the torsion beam of the vehicle and formed different from each other in size, a rear tail of the pair of tails which is formed at the rear portion of the vehicle is larger than a front tail formed in the front portion of the torsion beam, the upper and lower portions of the torsion beam are gradually apart from each other with at least two predetermined slopes as they goes from the middle portion to both distal end of the torsion beam. Therefore, roll stiffness is increased and durability is improved.

6 Claims, 8 Drawing Sheets

TORSION BEAM OF SUSPENSION

CROSS-REFERENCE TO RELATED APPLICATION

This Nonprovisional application claims priority under 35 U.S.C. §119(a) on Patent Application No. 10-2007-0072932 filed in Korea on Jul. 20, 2007, the entire contents of which are hereby incorporated by reference.

BACKGROUND OF THE INVENTION

1. Field of the Invention

The present invention relates to a torsion beam of a suspension of a vehicle, and more particularly, to a torsion beam of a suspension of a vehicle having a larger diameter of a rear tail than that of a front tail.

2. Description of the Background Art

Figure 1:
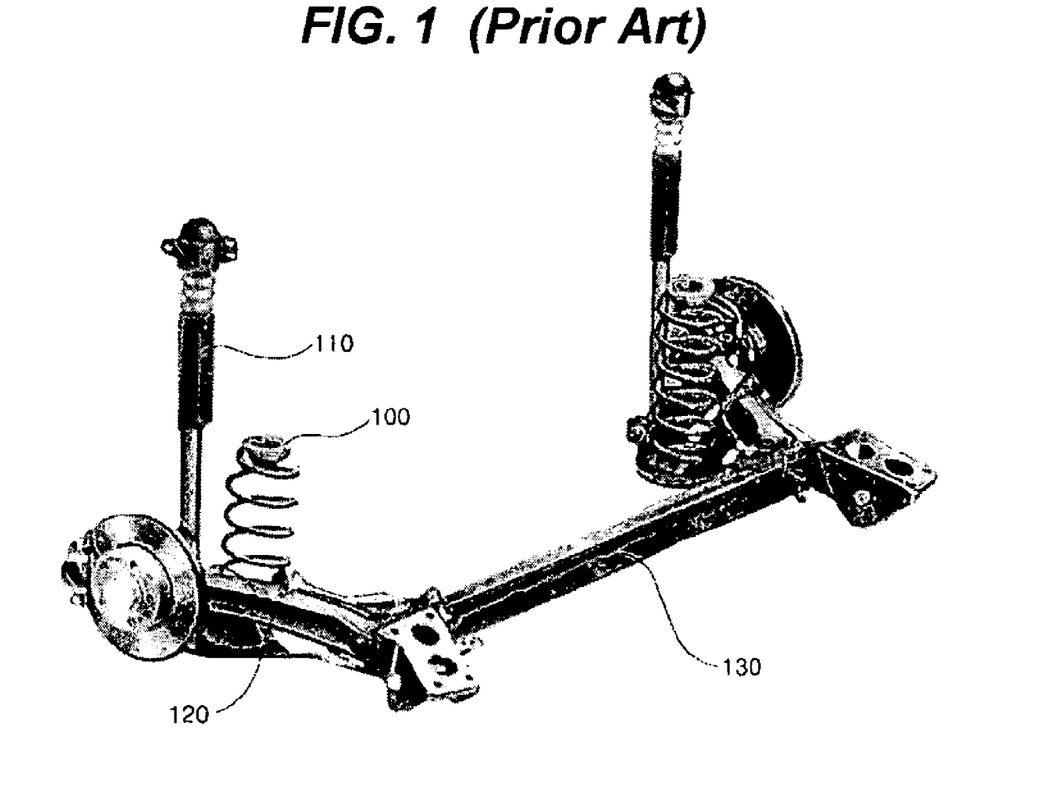
FIG. 1 is a perspective view illustrating a conventional suspension of a vehicle.

As illustrated in FIG. 1, a suspension of a vehicle connects a vehicle body to wheels and absorbs shock and vibration applied from a road during traveling to improve a ride comfort and stability of the vehicle.

The suspension is categorized into an integrated type for connecting right and left wheels to each other by an axle and an independent type in which the right and left wheels are independently driven, and includes a spring 100 for absorbing shock transmitting from the road, a shock absorber 110 for improving a ride comfort by restricting free vibration of the spring 100, arms and links 120 for controlling operation of the wheels.

As a compromising type of the integrated type and the independent type, a torsion beam type suspension includes left and right trailing arms 120 that are coupled with each other by a single member called as a cross beam or a torsion beam 130. The torsion beam suspension is characterized in that a length of the link is short in comparison to a strut type and a double wishbone type, the number of rubber bushes serving as a vibration shaft is little, friction hysteresis is less during the suspension stroke, and high end ride comfort is enabled.

Moreover, although designed performance region is not high due to simple components, the torsion beam suspension has been with low cost used in rear wheel suspensions of a subcompact car and a premium mid-size car for scores of years due to a relatively high traveling stability in comparison to low manufacturing cost and light weight.

Figure 2:
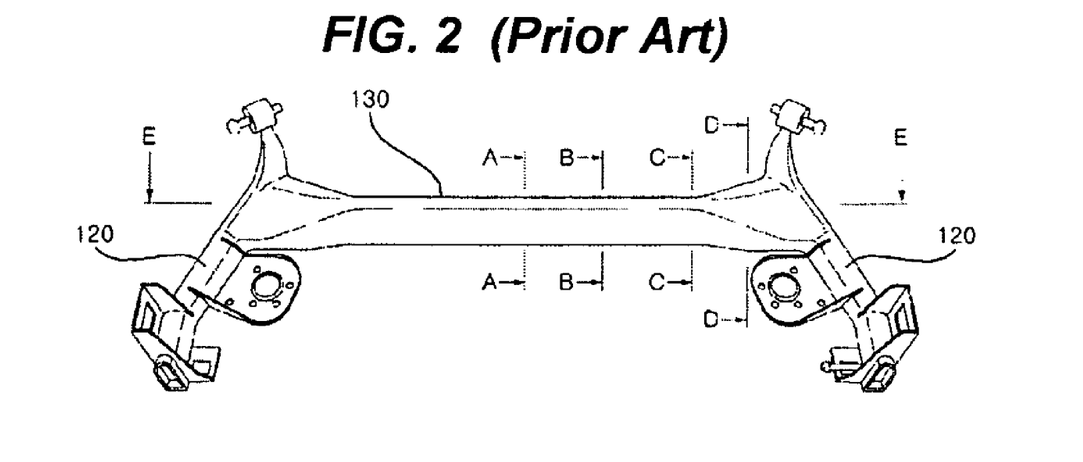
FIG. 2 is a perspective view illustrating a torsion beam of the conventional suspension of a vehicle.

FIG. 2 is a perspective view illustrating a conventional suspension of a vehicle, and FIGS. 3A to 3D and 4 are sectional view illustrating respective parts of the conventional suspension.

A torsion beam 130 of the conventional suspension of a vehicle plays an important part of controlling roll stiffness, lateral stiffness, and toe variation, and a tubular beam type torsion beam in which a reinforced plate and a torsion bar are not required, the number of components can be reduced, and weight can be reduced, is widely used.

Hereinafter, the tubular beam type torsion beam will be described in detail as follows.

The tubular beam type is manufactured in such a way that a pipe-shaped member is positioned between upper and lower presses in which one of the presses moved up and down, to press the pipe-shaped member.

The conventional tubular beam type manufactured as described above, as illustrated in FIGS. 3A to 3D, is broadened from the middle portion of the torsion beam 130 to right and left ends of the torsion beam 130 in the longitudinal direction of the torsion beam 130, that is, as goes toward the place where the trailing arms 120 is disposed.

Figure 4:
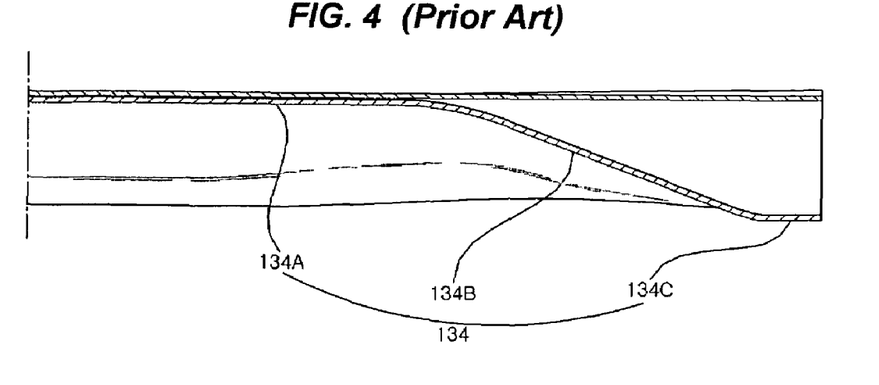
FIG. 4 is a sectional view taken along the line E-E of FIG. 2.

Moreover, as illustrated in FIG. 4 which is a sectional view taken along the line E-E of FIG. 2, lateral sections of the right- and left portions positioned symmetric with respect to the middle portion of the torsion bean 130 has an upper line 132 which is approximately horizontal and a lower line 134 comprising the first linear part 134A, the second linear part 134B, and the third linear part 134C.

The first linear part 134A of the lower line 134 extends horizontally from the middle portion to its distal end portion in the longitudinal direction of the torsion beam 130. The second linear part 134B of the lower line 134 extends downwardly inclined from the distal end portion of first linear part 134A. The third linear part 134C of the lower line 134 extends horizontally from the distal end portion of the second linear part 134B to the distal end portions of the torsion beam 130 in the longitudinal direction of the torsion beam 130.

Furthermore, the tubular type beam torsion beam 130 has a structure symmetrical with respect to the middle portion of the front-to-rear direction of the vehicle.

However, the conventional tubular type torsion beam has the following drawbacks.

Figure 3A:
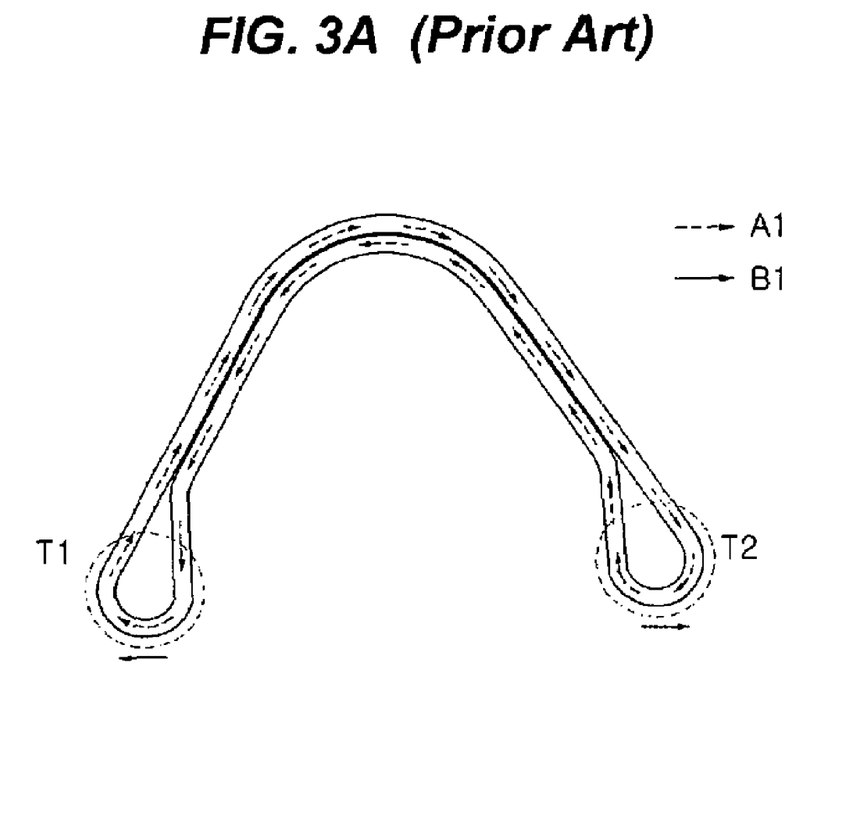
FIG. 3A is a sectional view taken along the line A-A of FIG. 2.
Figure 3B:
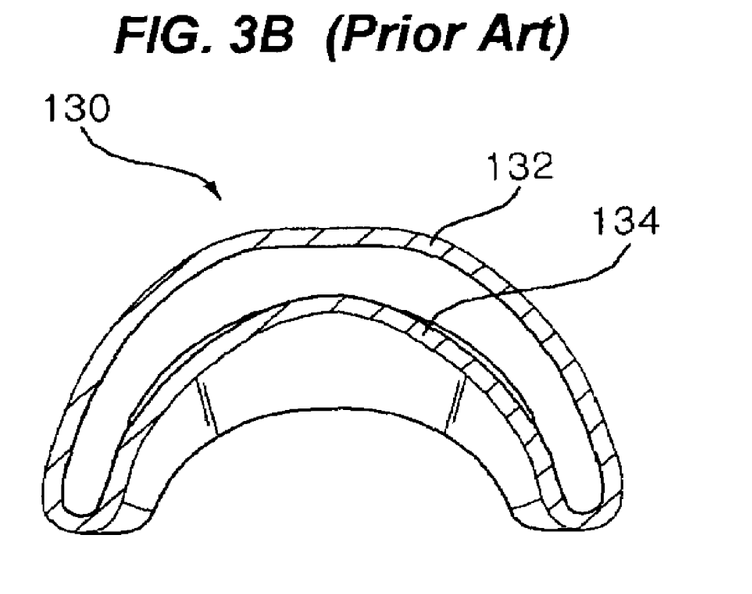
FIG. 3B is a sectional view taken along the line B-B of FIG. 2.
Figure 3C:
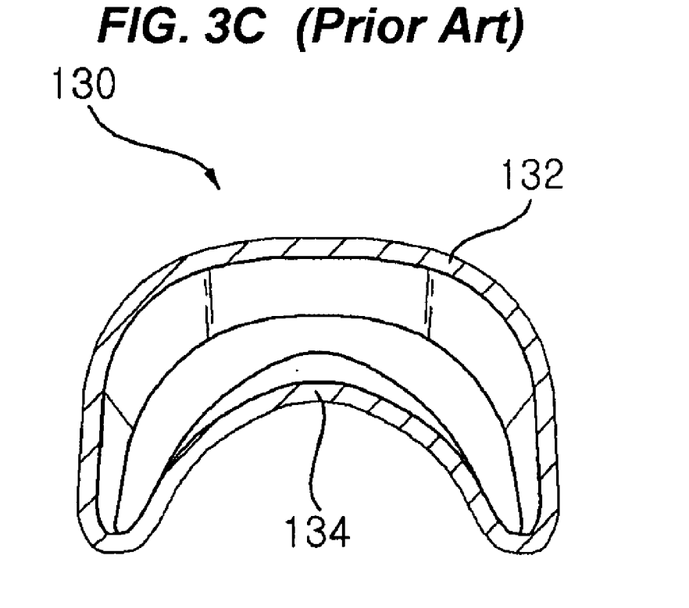
FIG. 3C is a sectional view taken along the line C-C of FIG. 2.
Figure 3D:
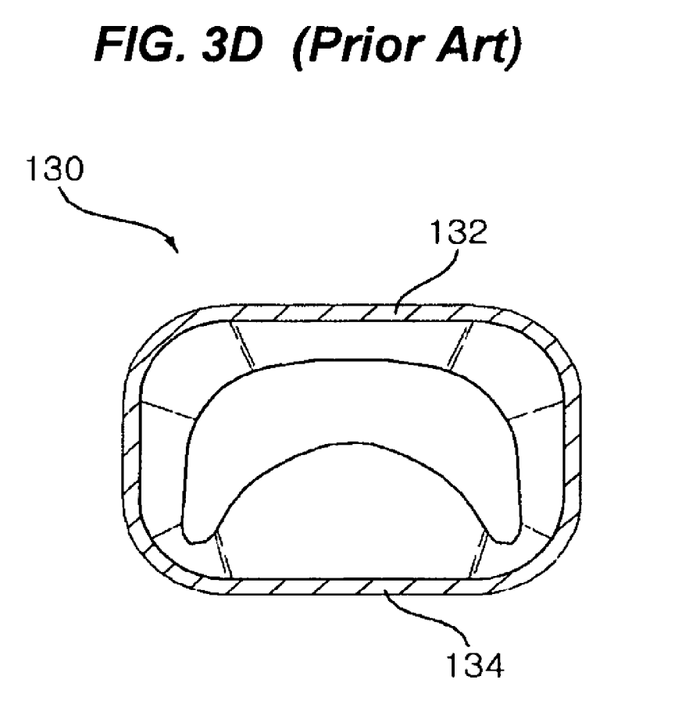
FIG. 3D is a sectional view taken along the line D-D of FIG. 2.

Firstly, in FIG. 3A which is a sectional view taken along the line A-A of FIG. 2, a rolling force is assumed to be applied to a portion of the torsion beam 130 for an explanation.

In the drawing, a dotted arrow A1 indicates a sheer flow resisting the rolling force applied to the torsion beam 130. The solid arrow B1 indicates a reactive force generated by a bending moment caused by the rolling force.

In the tubular beam type torsion beam 130, as illustrated in FIG. 3A, the shear flow A1 resisting the rolling force and the reactive force B1 generated by the bending moment may be canceled at the rear tail T2 because of their opposite action directions each other. In contrast, at the front tail T1, the direction of the shear flow A1 resisting the rolling force and the direction of the reactive force B1 generated by the bending moment are in the same direction so that the resultant reactive force at the front tail T1 is not canceled but increased.

Meanwhile, in the conventional scheme, the sizes of the front and rear tails T1 and T2 are decreased to increase the shear flow A1 resisting the rolling force. However, in this case, the increased shear flow deteriorates the durability of the torsion beam 130 since the concentration of stress is increased.

Moreover, as illustrated in FIG. 4, shear stress is easily concentrated at the connection portion between the first and second linear parts 134A and 134B of the lower line 134 of the torsion beam 130 due to the abrupt change of the slope between the first and second linear parts 134A and 134B.

Further shear stress is easily concentrated at the connection portion between the second and third linear parts 134B and 134C of the lower line 134 of the torsion beam 130 due to the abrupt change of the slope between the second and third linear parts 134B and 134C.

These concentrated shear stresses make cracks occur at the connection portions easily. In other words, as indicated by Arabian numbers in FIGS. 5A to 5C, the roll stiffness and the durability are inferior due to the rolling and the spring reactive force.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, an object of the present invention is to provide a torsion beam of a vehicle suspension capable of increasing roll stiffness and of improving durability by changing only a shape of torsion beam.

According to an aspect of the present invention, there is provided a torsion beam of a vehicle suspension including: an upper and lower portion bent in the front-to-rear direction along the longitudinal axis of the torsion beam; and a pair of tails rounded at both front and rear ends of the torsion beam and formed different from each other in size.

Preferably, a rear tail of the pair of tails which is formed at the rear portion of the torsion beam is larger than a front tail formed in the front portion of the torsion beam.

A radius of curvature of a rounded lower end of a rear tail is greater than that of a rounded lower end of a front tail.

A length from a lower end to a leading end of a rear tail is larger than a length from a lower end to a leading end of a front tail.

The upper and lower portions of the torsion beam are gradually apart from each other as goes from the middle portion to both dial end portions in the longitudinal direction of the torsion beam.

The middle portion of the torsion beam of the vehicle includes a structure in which the gap between the upper and lower portions is substantially small except for front and rear tails in the front-to-rear direction.

In a lateral section an upper line formed by the upper portion is approximately horizontal along the longitudinal direction of the torsion beam, and a lower line formed by the lower portion including at least two sloped lines positioned between the middle portion and both distal ends of the torsion beam and at least three connection places where the upper and lower portions are apart from each other in a different distance.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 6:
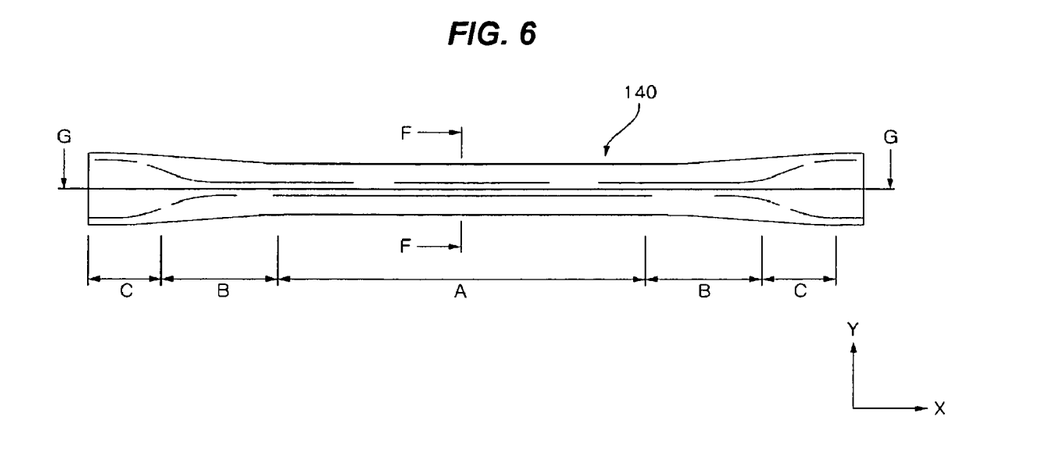
FIG. 6 is a perspective view illustrating a torsion beam of a vehicle suspension according to an embodiment of the present invention.
Figure 7:
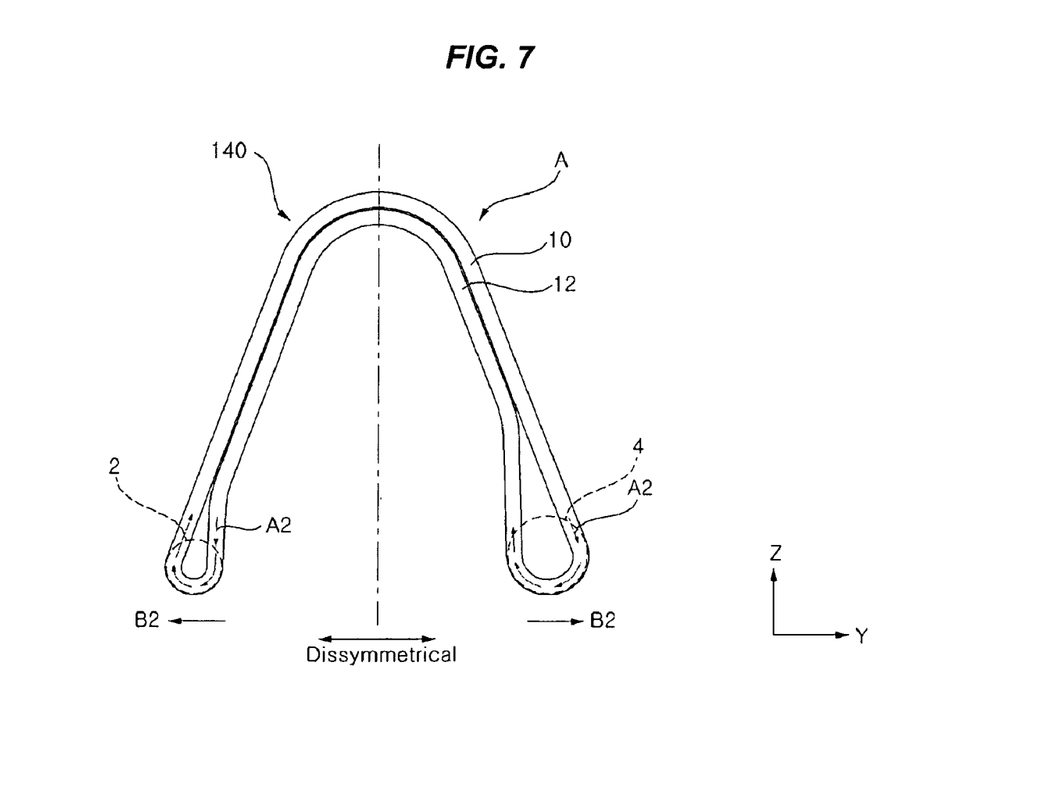
FIG. 7 is a sectional view taken along the line F-F of FIG. 6.
Figure 8:
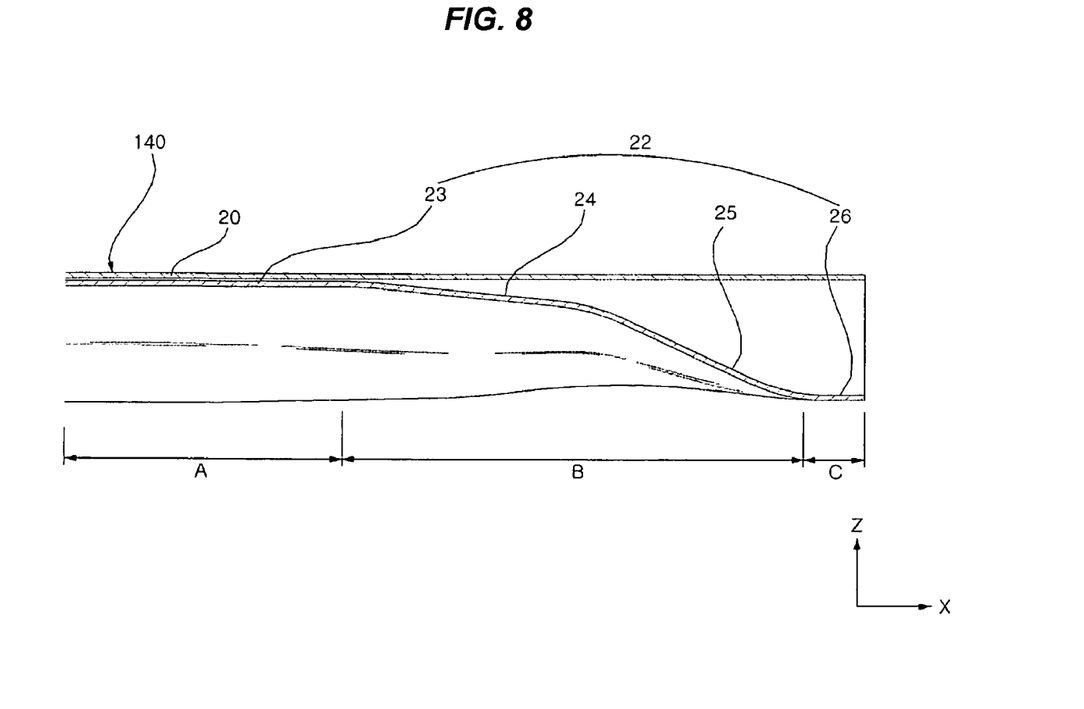
FIG. 8 is a sectional view of right portion of torsion beam taken along the line F-F and G-G of FIG. 6.

FIG. 6 is a perspective view illustrating a torsion beam of a vehicle suspension according to an embodiment of the present invention, FIG. 7 is a sectional view taken along the line F-F of FIG. 6, and FIG. 8 is a sectional view of a right portion of torsion beam taken along the line F-F and G-G of FIG. 6.

Hereinafter, for convenience of illustration, the left-to-right direction of a vehicle is indicated by an arrow X, the front-to-rear direction of the vehicle is indicated by an arrow Y, and the down-to-up direction of the vehicle is indicated by an arrow Z.

A torsion beam of a vehicle suspension according to an embodiment of the present invention is a tubular beam type torsion beam, and is manufactured by pressing a pipe member by a press that moved up and down. Here, for convenience of illustration, a part designated by a reference numeral 10 in FIG. 7 is referred to an upper portion of the torsion beam, and a part designated by a reference numeral 12 is referred to a lower portion of the torsion beam.

In an exemplary embodiment of the present invention, the torsion beam includes a first region A, a second region B and a third region C configured by the upper portion 10 comprising an upper line 20 and by the lower portion 12 comprising a lower line 22.

The upper line 20 extends horizontally from the middle portion of the torsion beam 140 to both distal end portions of the torsion beam 140 in the longitudinal direction of the torsion beam 140 continuously.

However, the lower line 22 may be inclined with at least two different slopes with respect to the upper line 20 in the second region B as explained below in detail.

The first region A of the torsion beam 140 is a region to which an inner surface of the upper portion 10 and an upper surface of lower portion 12 are set apart each other with small gap. The first range A extends for a predetermined distance from the middle portion of the torsion beam 140 toward both distal end portions of the torsion beam in the left-to-right direction X of the vehicle, i.e., along the longitudinal direction of the torsion beam The second region B of the torsion beam 140 is a region positioned for a predetermined distance from a distal end portion of the first region A toward the distal end portion of the torsion beam in the left-to-right direction X of the vehicle, i.e., along the longitudinal direction of the torsion beam.

In the second region B, the lower portion 12 of the torsion beam are gradually inclined apart from the upper portion 10 with at least two slopes such as first and second predetermined slopes.

The third region C of the torsion beam 140 is a region positioned for a predetermined distance from a distal end portion of the second region B toward the distal end portion of the torsion beam in the left-to-right direction X of the vehicle, i.e., along the longitudinal direction of the torsion beam.

In the third region C, the lower portion 12 of the torsion beam maintains substantially the same distance from the upper portion 10.

At the first region A, the front and rear side portions of the torsion beam 140 is bent downwardly about the longitudinal axis of the torsion beam 140. In other words, the first region A of the torsion beam has an approximate upwardly-convexed V- or U-shape in the down-to-up direction Z.

In this embodiment of the present invention, in the first region A of the torsion beam 140, the upper and lower portions 10 and 12 are set apart by a small gap. However, since the torsion beam 140 is manufactured by deforming the shape of a single pipe member by press, it can be understood that the front and rear tails 2 and 4 at the first region A are formed between the upper and lower portions 10 and 12 substantially at the distal front and rear boundary positioned in the front-to-rear direction of the torsion beam 140.

Particularly, the gap between the upper and lower portions 10 and 12 positioned substantially at the middle portion of the torsion beam 140 in the first region A is smaller than each diameter of the front and rear tails 2 and 4 such as about 0.2 mm in the exemplary embodiment of the present invention.

However, in this embodiment of the present invention, respective diameter of the front and rear tails 2 and 4 is manufactured different in size in contrast with the conventional scheme. This is because stress flow applied to the front and rear portions 2 and 4 of the torsion beam are different as explained in the following.

In this exemplary embodiment, the rolling force is assumed to be applied to a part of the torsion beam as shown in FIG. 7. The rolling force causes the bending moment to the torsion beam 140 which results in the reactive force B2 horizontally and outwards on the respective front trail 2 and the rear trail 4. The rolling force further causes the shear flow A2 that resists the rolling force along the upper portion 10 and the lower portion 12 of the torsion beam 140.

In this exemplary embodiment, at the front tail 2, the direction of the reactive force B2 caused by the bending moment is the same as the direction of the shear flow A2 caused by the rolling force so that the resultant force of the shearing force caused by the shear stress flow A2 and the reactive force B2 is not cancelled but increased.

However, in the exemplary embodiment of the present invention, the size of the rear tail 4 is larger than the front tail 2 to decrease the shear flow A2 at the rear tail 4 and thus may compensate the resultant force applied at the front trail 2 as explained the following.

Since the shear force at the rear trail 4 is inversely proportional to the radius of the rear trail 4 and thus the shear force at the rear trail 4 is reduced due to the increase of the radius of the rear trail 4, the resultant force of the reactive force A2 and the shearing force caused by the shear flow B2 are increased to the right direction in the drawing.

Accordingly, the resultant un-cancelled force of the front trail 2 applied to the left direction is substantially cancelled by the resultant force of the rear trail 4 applied to the right direction in the drawing.

Preferably, a radius of curvature of the lower end portion of the rounded rear tail 4 is larger than that of the lower end portion of the rounded front tail 2.

Therefore, the embodiment of the present invention includes the case that, the length, from the lower end portion of the rear tail 4 to the leading end of the rear rail 4 from which the upper and lower portions 10 and 12 of the torsion beam 140 start to be apart from each other, is larger than the length from the lower end portion of the front tail 2 to the leading end of the front tail 2 from which the upper and lower portions 10 and 12 start to be apart from each other.

Hereinafter, the second region B set forth above will be explained in detail.

Referring to FIG. 8 which is a sectional view of right side of a torsion beam taken along the line F-F and the line G-G of FIG. 6, an upper line 20 forming the upper portion 10 is an approximately horizontal line, and a lower line 22 forming the lower portion 12 comprises at least two sloped lines wherein a connection place of the sloped lines exists where the upper and lower portions 10 and 12 are apart from each other.

In detail, in the second region B, the lower line 22 starts to be downwardly inclined from a distal end portion of the lower line 22 positioned at the first region A toward the third region C of the vehicle. The lower line 22 is bent at a connection place where the upper and lower portions 10 and 12 are gradually apart from each other at least once such that a changing rate in the left-to-right direction of the vehicle is minimized.

In other words, the lower line 22 includes a first linear part 23 approximately horizontal from the middle portion of the torsion beam 140 to the proximate end portion of the second region B in the left-to-right direction of the vehicle.

The lower line 22 includes a second linear part 24 extended from the distal portion of the first linear part 23 and downwardly inclined by a predetermined slope to a distal end portion of the second linear part 24

The lower line 22 includes a third linear part 25 extended from the distal end portion of the second linear part 24 and downwardly inclined by a slope greater than that of the second linear part 24 to a proximate end portion of the fourth linear part 25 positioned in the third region C The lower line 22 further includes a fourth linear part 26 extended from the distal end portion of the third linear part 25 and approximately horizontal to the distal end portion of the torsion beam 140 in the third region C.

However, since a left side of a torsion beam taken along the line F-F and the line G-G of FIG. 6 is the same symmetrical configuration as the right side of a torsion beam with respect to the middle portion of the torsion beam in the longitudinal direction of the torsion beam 140, the explanation about the left side of a torsion beam taken along the line F-F and the line G-G of FIG. 6 is not repeated.

Connection places of the respective linear parts 23, 24, 25, and 26 are preferably rounded in order to prevent stress from being concentrated due to the rolling force or the bending moment.

Figure 9A:
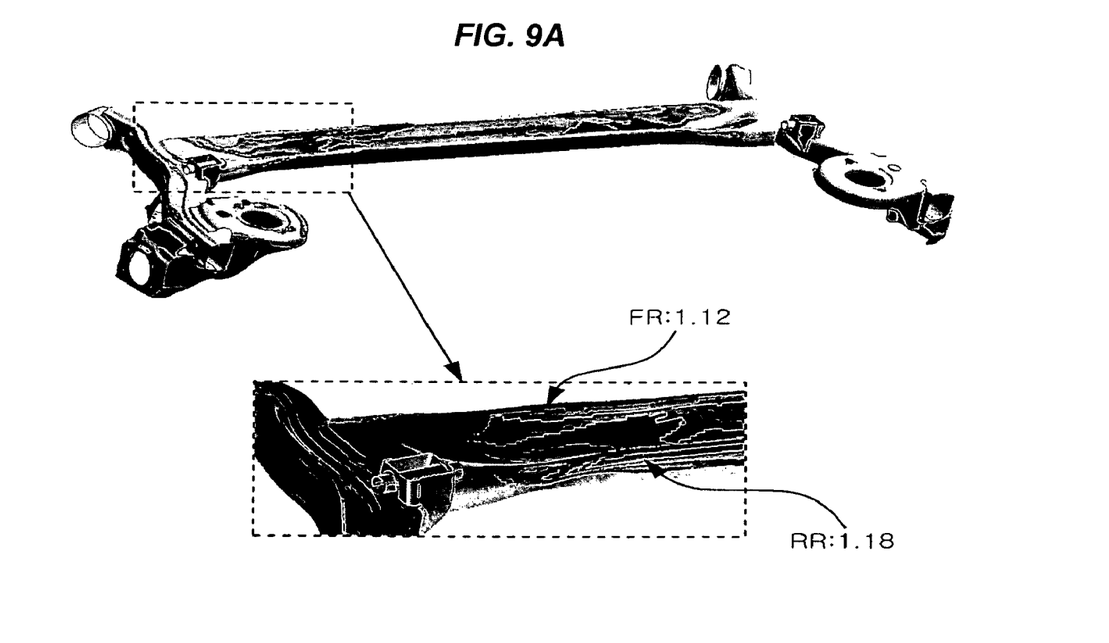
FIG. 9A is an experimental analyzing view illustrating rolling of the torsion beam and reactive force of a suspension spring of a vehicle suspension according to the embodiment of the present invention.
Figure 9B:
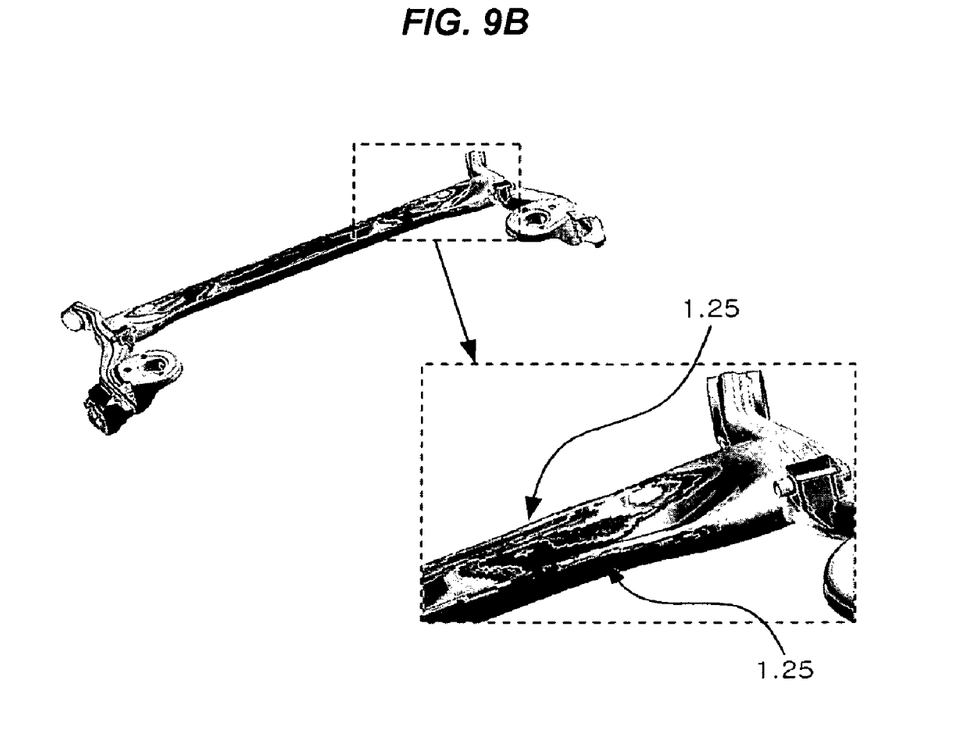
FIG. 9B is an experimental analyzing view illustrating rolling reactive force of the torsion beam of a vehicle suspension according to the embodiment of the present invention.
Figure 9C:
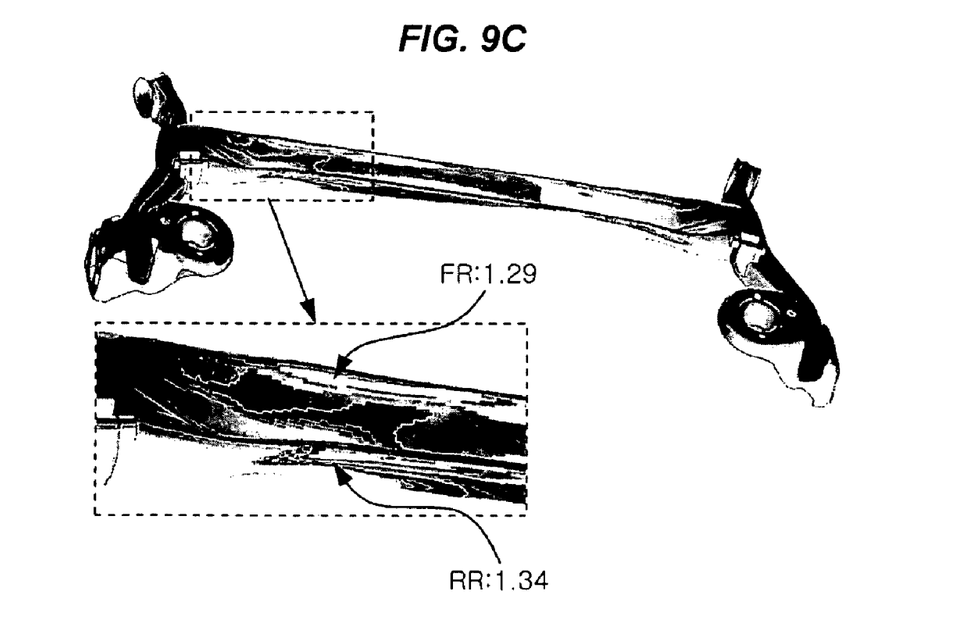
FIG. 9C is an experimental analyzing view illustrating upward and downward durability of a vehicle suspension according to the embodiment of the present invention.

In brief, the torsion beam 140 according to the embodiment of the present invention is configured that the size of the rear tail 4 is larger than the front tail 2 and the upper and lower portions 10 and 12 are gradually apart from each other from the middle portion to the distal end portions of the torsion beam. As a result, the resultant force applied to the front trail 2 and the rear trail 4 is substantially balanced so that the roll stiffness can be increased when the rolling force is applied, as illustrated in FIG. 9C.

Figure 5A:
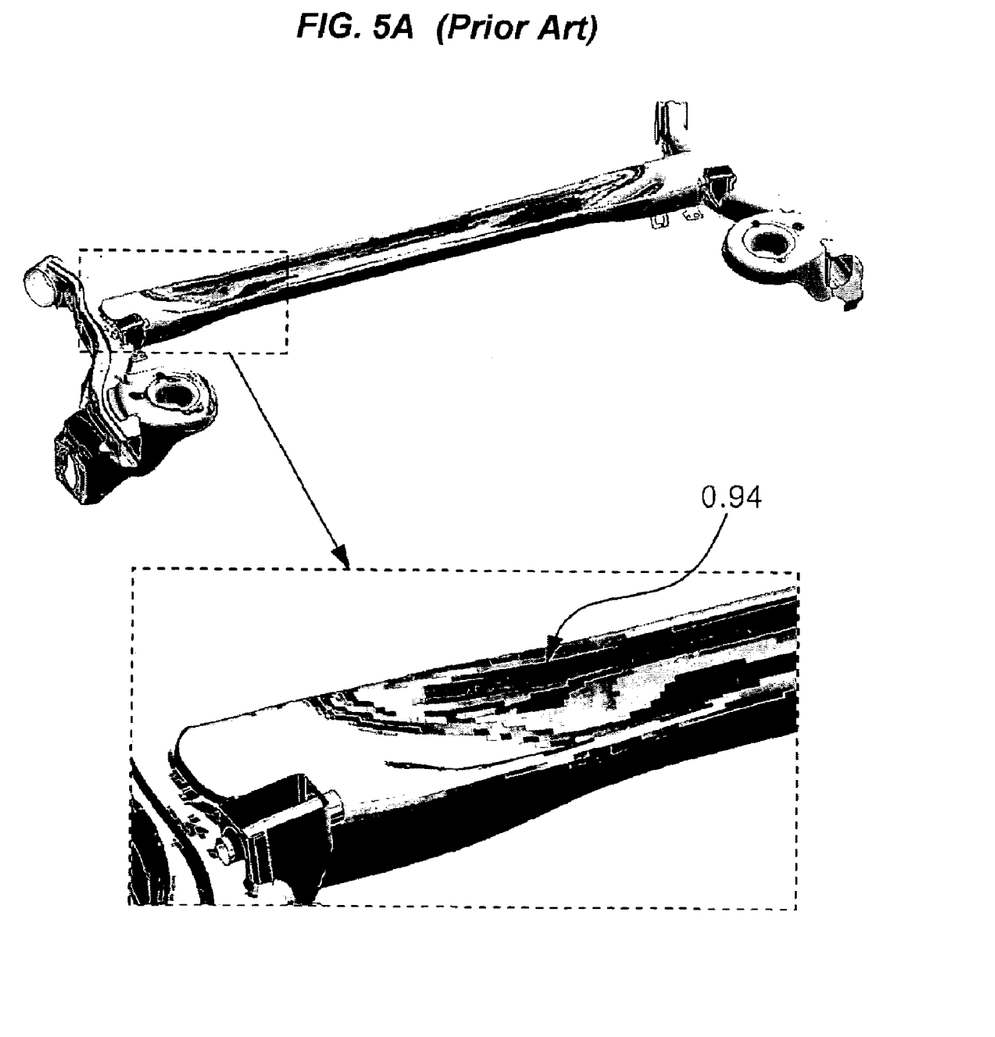
FIG. 5A is an experimental analyzing view illustrating rolling of the torsion beam and reactive force of a suspension spring of the conventional vehicle suspension.
Figure 5B:
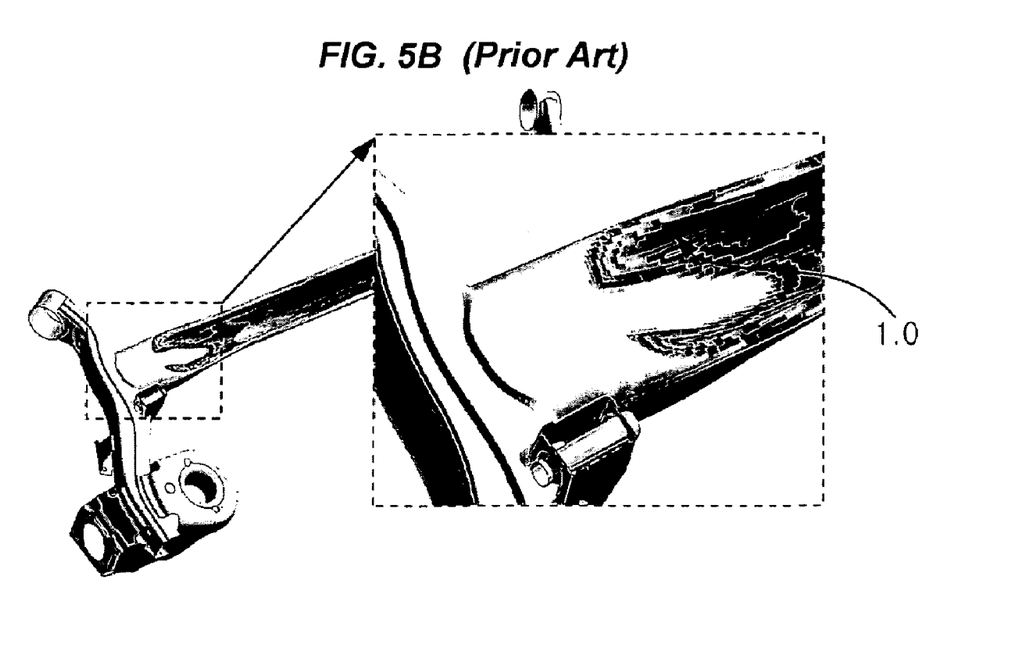
FIG. 5B is an experimental analyzing view illustrating rolling reactive force of the torsion beam of the conventional vehicle suspension.
Figure 5C:
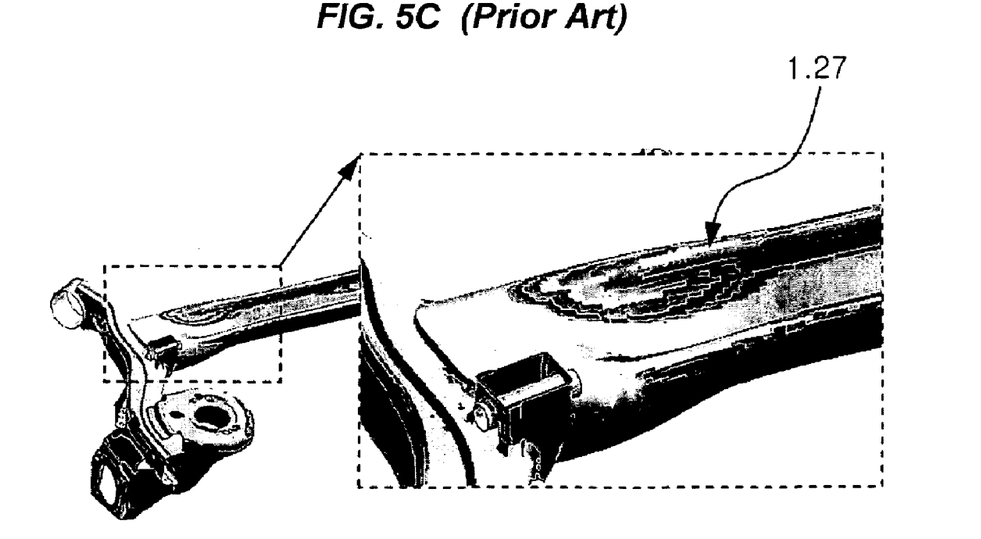
FIG. 5C is an experimental analyzing view illustrating upward and downward durability of the conventional vehicle suspension.

Further the substantially-balanced resultant force applied to the front trail 2 and the rear trail 4 causes the durability of the torsion beam 140 to be improved in comparison to that of FIGS. 5A to 5C. Since the radius of the rear trail 4 is increased, the concentration of stress is reduced to increase the durability of the torsion beam 140. Therefore the roll stiffness can be increased and the durability can be improved by changing only the shape.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A torsion beam of a vehicle suspension comprising:
    a upper and lower portion bent in a front-to-rear direction of the vehicle along a longitudinal axis of the torsion beam; and
    a pair of tails positioned substantially at both front and rear side ends of the torsion beam and formed different from each other in size;
    wherein, and upper line formed by the upper portion extends substantially horizontal from the middle portion of the torsion beam to distal end portions of the torsion beam in the longitudinal direction of the torsion beam; and
    a lower line formed by the lower portion including at least two differently-sloped lines positioned in each predetermined position, and a substantially horizontal line extended from the two differently-sloped lines to the distal end portion of the torsion beam between the middle portion and a left distal end and between the middle portion and a right distal end of the torsion beam wherein the at least two differently-sloped lines have at least three connection places where the upper and lower portions are apart from each other in different distances.

2. The torsion beam of a vehicle suspension of claim 1, wherein a rear tail of the pair of tails which is formed at the rear direction is larger than a front tail formed in the front direction.

3. The torsion beam of a vehicle suspension of claim 1, wherein a radius of curvature of a lower end portion of the rear tail is larger than that of a lower end portion of the front tail.

4. The torsion beam of a vehicle suspension of claim 1, wherein a length from a lower end portion to a leading end of a rear tail is larger than a length from a lower end to a leading end portion of a front tail.

5. The torsion beam of a vehicle suspension of claim 1, wherein the upper and lower portions of the torsion beam are gradually apart from each other as goes from a middle portion of the torsion beam toward both distal ends of the torsion beam in the longitudinal direction of the torsion beam.

6. The torsion beam of a vehicle suspension of claim 1, wherein the connection place is rounded and bent to prevent stress from being concentrated therein.

* * * * *